United States Patent [19]

Morris

[11] 4,041,360
[45] Aug. 9, 1977

[54] CONTROL CIRCUIT FOR AN ELECTRIC MOTOR

[75] Inventor: George E. Morris, Sterling, Ill.

[73] Assignee: General Electric Company, Fort Wayne, Ind.

[21] Appl. No.: 622,658

[22] Filed: Oct. 15, 1975

[51] Int. Cl.² .............................................. H02P 1/44
[52] U.S. Cl. ........................... 318/221 R; 318/225 R; 318/305
[58] Field of Search ........... 318/221 R, 221 H, 225 R, 318/305

[56] References Cited

U.S. PATENT DOCUMENTS

| | | | |
|---|---|---|---|
| 2,073,532 | 3/1937 | Ballman | 318/225 R X |
| 2,203,927 | 6/1940 | Rutherford | 318/225 R |
| 2,244,757 | 6/1941 | Appleman | 318/221 R |
| 2,840,772 | 6/1958 | Seeley | 318/225 R X |
| 3,359,476 | 12/1967 | Charlton | 318/225 R |

Primary Examiner—Gene Z. Rubinson
Attorney, Agent, or Firm—Joseph E. Papin

[57] ABSTRACT

A control circuit for an electric motor adapted for operation in three speed modes and having a winding circuit with three main windings serially connected together in circuit relation therein adapted for connection in three different speed mode effecting combinations across a power source. The control circuit has means for rendering two of the windings effective in the winding circuit and alternatively rendering all three of the windings effective in the winding circuit. A device is operable generally in response to different preselected temperature conditions for respectively coupling one of the two windings and both of the two windings across the power source when the two windings are rendered effective in the winding circuit thereby to effect the operation of the motor in two different ones of the speed modes thereof and for also coupling the three windings across the power source when the three windings are rendered effective in the winding circuit thereby to effect the operation of the motor in the third different speed mode thereof.

22 Claims, 2 Drawing Figures

CONTROL CIRCUIT FOR AN ELECTRIC MOTOR

FIELD OF THE INVENTION

This invention relates in general to control circuits and in particular to those control circuits for effecting three speed operation of an electric motor.

BACKGROUND OF THE INVENTION

In the past, there have been various solid state control circuits and electro-mechanical devices for automatically effecting two speed operation of an electric motor, such as those which may be employed as a fan motor in a room or a central air conditioner for instance. The Slonneger U.S. Pat. No. 3,648,214 issued Mar. 7, 1972 for Condition-Responsive Electric Switch Mechanisms is one such electro-mechanical device utilized for automatically effecting dual speed operation of an electric motor and is incorporated herein by reference. Of course, it is believed that various types of control circuits have been utilized in the past for manually selecting the various speed operating modes of an electric fan motor in an air conditioning system or the like, including a three speed operable fan motor.

SUMMARY OF THE INVENTION

Among the several objects of the present invention may be noted the provision of a control circuit for an electric motor adapted for three speed operation; the provision of such control circuit having electro-mechanical components for effecting the operation of such electric motor in three different speed modes; the provision of such control circuit in which the three speed operation of such electric motor is effected automatically and in response to the occurrence of preselected conditions; the provision of such control circuit in which certain combinations of the windings in such electric motor are alternatively or selectively rendered effective so as to be coupled across a power source upon the occurrence of preselected temperature conditions thereby to effect cooperation of such electric motor in its different speed modes; and the provision of such control circuit which is simplistic in design, easily assembled and economically manufactured. These as well as other objects and advantageous features of the present invention will be in part apparent and in part pointed out hereinafter.

In general and in one form of the invention, a control circuit is provided for an electric motor adapted for three speed operation and having a winding circuit with at least three windings. The control circuit includes means movable between a first position for connecting two of the windings in circuit relation and a second position for connecting all of the windings in circuit relation, respectively, and means operable generally upon the occurrence of certain conditions for alternatively effecting energization of one of the two windings and both of the two windings when said connecting means is in its first position and for also effecting the energization of all of the windings when said connecting means is in its second position.

BRIEF DESCRIPTION OF THE DRAWINGS

Corresponding reference characters indicate corresponding parts throughout the several views of the drawings.

The exemplifications set out herein illustrate the preferred embodiment of the invention in one form thereof, and such exemplifications are not to be construed as limiting in any manner the scope of the invention.

DETAILED DESCRIPTION OF THE PREFERRED EMBODIMENT

Figure 2:
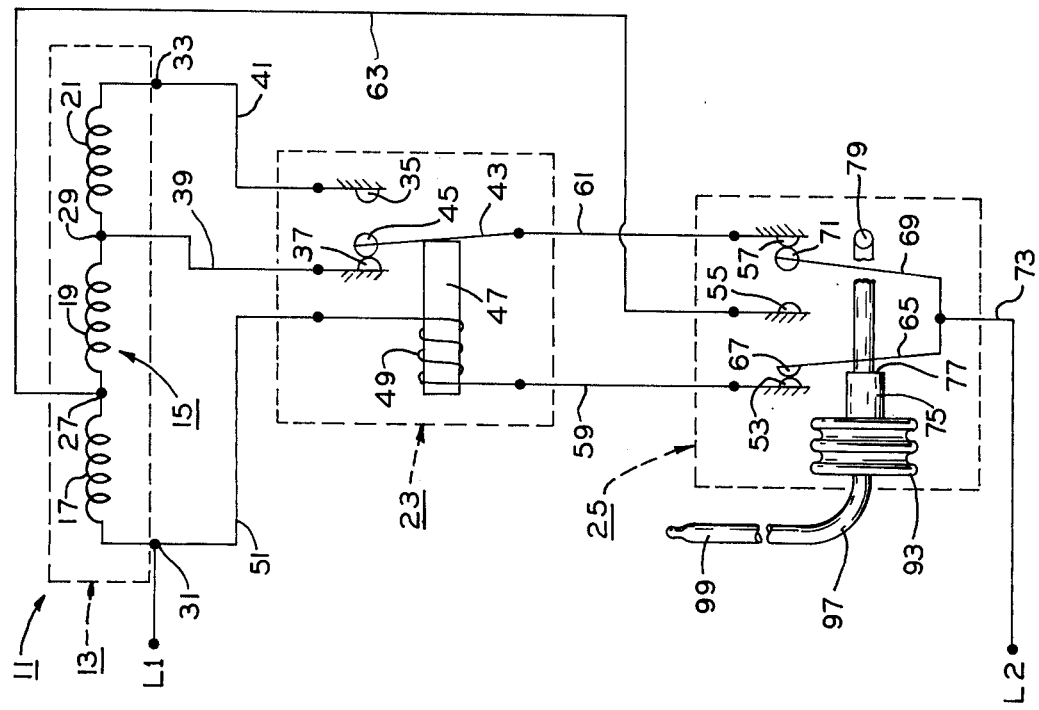
FIGS. 1–3 are schematic diagrams of a control circuit in one form of the invention adapted for operating an electric motor in three different speed modes.
Figure 1:
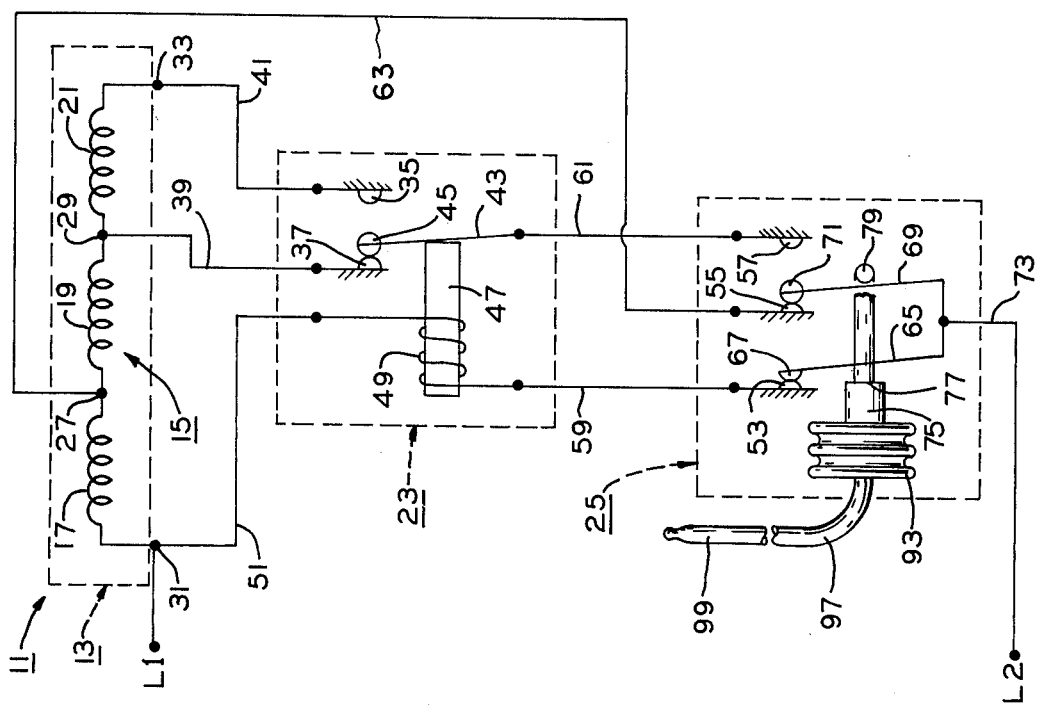
Figure 3:
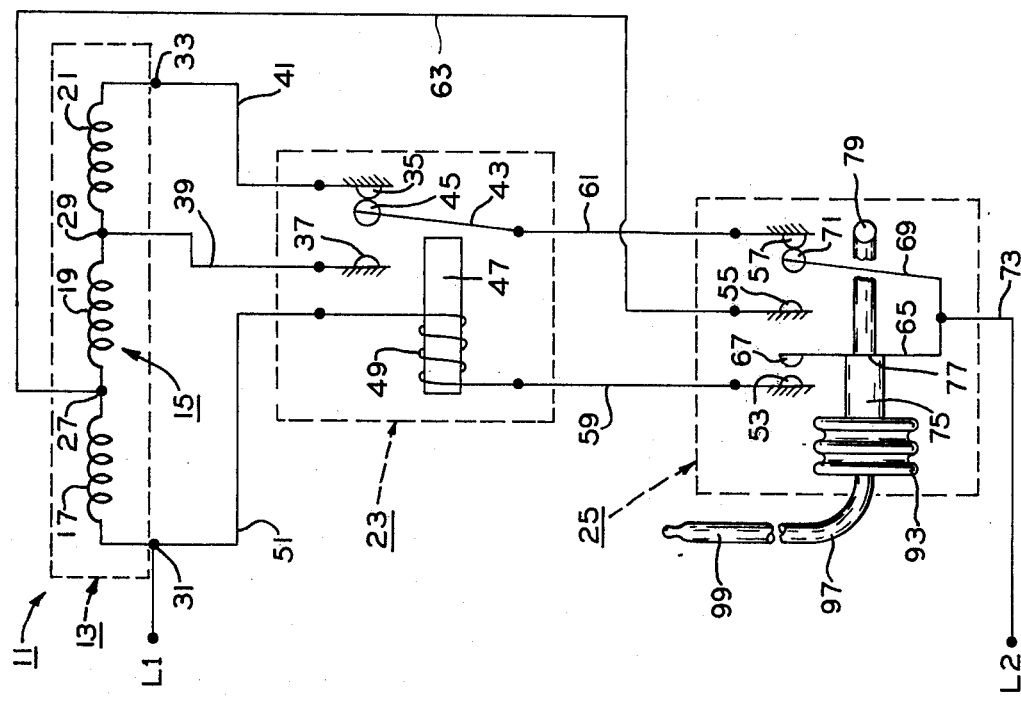

Referring now to the drawings in general, there is disclosed a control circuit 11 in one form of the invention adapted for operating an electric motor, indicated schematically at 13, in three speed different modes (FIGS. 1–3). Motor 13 has a main winding circuit or arrangement, indicated generally at 15, including three main or run windings 17, 19, 21 as compared with start or auxiliary windings adapted to be connected together in three different speed mode effecting combinations across a power source, such as may be constituted by power or line terminals L1, L2. In control circuit 11, means, such as a relay device or the like indicated generally at 23, is provided for selectively rendering two of windings 17, 19 effective in winding circuit 15 and alternatively or selectively rendering all three of windings 17, 19, 21 effective in the winding circuit. A device, such as a temperature or condition responsive means or electric switch indicated generally at 25 (FIGS. 1–4), is operable generally in response to different preselected or predetermined temperature conditions or other preselected or predetermined conditions for respectively coupling one winding 17 of the aforementioned two windings 17, 19 and both of the two windings across power source L1, L2 when the two windings are rendered effective in winding circuit 15 thereby to effect operation of motor 13 in two different ones of the speed modes thereof and also for coupling all three windings 17, 19, 21 across the power source when the three windings are rendered effective in the winding circuit thereby to effect the operation of the motor in the third different speed mode thereof.

More particularly and with specific reference to FIGS. 1–3, winding circuit 15 of motor 13 has its windings 17, 19, 21 connected together generally in series circuit relation with winding junctions or connecting points 27, 29 between windings 17, 19 and 19, 21, respectively, and the free ends of windings 17, 21 are connected with winding or motor terminals 31, 33. Of course, winding connection points 27, 29 and winding terminals 31, 33 may be led out to a terminal board or other such connection means (not shown) for motor 13, if desired. One end of winding 17 or terminal 31 is adapted to be connected with one side of power source L1, L2, i.e., to line terminal L1 when the motor is placed in operation, and if desired, a motor starting switch (not shown) may be connected in the line between line terminal L1 and winding terminal 31 for manual or selective starting and stopping of motor 13 across power source L1, L2 by an operator. While motor 13 is disclosed herein as a fan duty motor generally of shaded-pole type, it is contemplated that other types of motors and perhaps having different winding arrangements or circuits may be utilized within the scope of the invention so as to be generally encompassed by the objects and advantageous features thereof.

Connecting or winding effective rendering means, such as relay device 23, is provided with a pair of contacts 35, 37 which may be stationary and which are adapted for connection in circuit relation across winding 21 of motor winding circuit 15 with contact 35 being connected to winding terminal 33 by a lead 39 and contact 37 being connected to winding connection point 29 by a lead 41. An armature assembly such as a switch or switching means 43, is pivotally mounted in relay device 23 and carries a movable double-contact 45 for making and breaking engagement with stationary contacts 35, 37, respectively. Actuating or or operation effecting means, such as a magnetic core or pole piece 47, is adapted to be energized for automatically attracting armature assembly 43 between a pair of positions in relay 23, i.e., from its normal or at-rest position engaging movable contact 45 with stationary contact 35 toward another position in magnetic holding engagement with the pole piece thereby to make the movable contact with stationary contact 37. An energizing or current carrying coil 49 is wound or otherwise disposed about pole piece 43 for effecting its magnetization, and one end of the coil is adapted to be connected with winding terminal 31 through a lead 51 so as to be connected in circuit relation with line terminal L1. The other end of coil 49 and switch blade 43 are respectively connected in circuit relation with contacts of coupling device or condition responsive electric switch 25, as discussed in detail hereinafter. If a more detailed discussion of the construction or operation, which is discussed hereinafter, of relay device 23 is desired, reference may be had to U.S. Pat. No. 2,866,025 issued Dec. 23, 1958 to D. E. Moran which is incorporated herein by reference. While the relay device 23 is disclosed herein for rendering effective windings 17, 19, 21 of motor winding circuit 15, it is contemplated that other relays or other switching devices may be utilized within the scope of the invention so as to be generally commensurate with the objects and advantageous features thereof.

Figure 4:
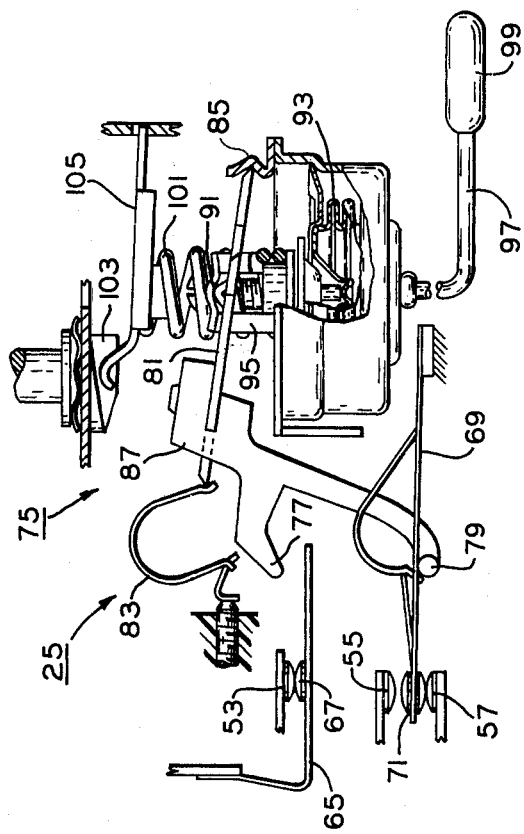
FIG. 4 is a generally schematic view of certain operational parts of a condition responsive means, such as an electro-mechanical switch device, shown in FIGS. 1–3.

Referring now also to FIG. 4, coupling or winding energization means, such as condition responsive means or electric switch 25, is provided with a housing generally of insulating material (not shown) adapted to mount the component parts of the electric switch including three contacts 53, 55, 57, which may be stationary and such contacts 53, 57 are respectively connected in circuit relation with the other or lower end of coil 49 and switch blade 43 of relay device 23 by leads 59, 61. Contact 55 is connected by another lead 63 in circuit relation to winding connection point 27 in motor winding circuit 15.

A current carrying contact element or slow-acting switch blade 65 is pivotally mounted in electric switch 25, and a movable contact 67 is carried on the switch blade for making and breaking engagement with stationary contact 53, the switch blade and the movable and stationary contacts comprising switch means or switching means in the electrical switch. In the at-rest position of switch blade 65, movable contact 67 thereon is disposed in making engagement with stationary contact 53, as may be seen in FIG. 1, and while switch blade 65 is disclosed generally as a "slow-acting" type, it is contemplated that a "snap-acting" type switch blade may be utilized within the scope of the invention so as to meet the objects and advantageous features thereof. Another current carrying contact element or snap-acting switch blade 69 is also pivotally mounted in electric switch 25, and a double movable contact 71 is carried on the switch blade for respective making and breaking engagement with stationary contacts 55, 57, the switch blades and the movable and stationary contacts comprising switch means or switching means in the electric switch. In the at-rest position of switch blade 69, movable contact 71 thereon is disposed in making engagement with stationary contact 55, as may also be seen in FIG. 1, and while switch blade 69 is disclosed generally as a snap-acting type, it is contemplated that other types of switch blades, such as a slow-acting type for instance, may be utilized within the scope of the invention so as to meet the objects and advantageous features thereof. Switch blades 65, 69 are respectively connected by a branch lead 73 to the other side of power source L1, L2, i.e., to line terminal L2.

Means, such as a contact or switch blade operator 75 or the like, is provided in electric switch 25 for driving or effecting the operation of switch blades 65, 69 between their various operating or contact making and breaking positions, as described in greater detail hereinafter, and operator or driving means 75 is provided with a pair of abutments 77, 79 for selective abutting or driving engagement with switch blades 65, 69, respectively, as discussed hereinafter. Referring now in detail to FIG. 4, operator 75 includes a pivot arm 81 having its leftward end pivotally supported by an adjustable, snap-action toggle mechanism, such as a toggle spring or toggle elememt 83, while the rightward end of the pivot arm is pivotally mounted at 85 within electric switch 25. A bifurcated finger or flange 87 on which abutments 77, 79 are provided is mounted by suitable means (not shown) to pivot arm 81 adjacent the leftward end thereof so that the flange is conjointly pivotally movable with the pivot arm. A recess or knife-like edges 91 are also provided on pivot arm 81 generally adjacent its mid-portion, and forces generated by a bellows 93 are transmitted to the pivot arm through a bearing assembly 95 disposed between the bellows and the knife edges of the pivot arm. Bellows 93 is communicated through a capillary tube 97 with a temperature sensing bulb 99 which is adapted to be disposed in a selected space (not shown) for sensing the temperature thereof, the bellows, tube and bulb, all containing a charge of a suitable vapor; thus, when the temperature of the space or environment in which the bulb may be located changes, the pressure of the vapor charge increases or decreases. This causes a corresponding increase or decrease in the force exerted by bellows 93 through bearing assembly 95 onto pivot arm 81 tending to move it in the clockwise direction (as seen in FIG. 4) about its pivot point 85. In this manner, pivotal movement of operator 75 is responsive to a temperature condition externally of electric switch 25 as may be sensed by bulb 99.

A range spring 101 acts to exert a continuing selected force on bearing assembly 95 tending to pivot operator 75 about its pivot point 85 in the counterclockwise direction (as seen in FIG. 4) against the force exerted on the operator by bellows 93. By varying the compression of range spring 101, the sensed temperature level or preselected temperature conditions at which electric switch 25 operates may be manually or selectively adjusted or predetermined. To this end, a manually adjustable cam 103 is provided in adjusting camming engagement with a cam follower 105 pivotally mounted in electric switch 25 so as to be in abutment with range spring 101. Upon manual rotary positioning of cam 103, cam follower 105 is pivotally moved so as to change the compression of range spring 101 exerted between the cam follower and bearing assembly 95. If a more detailed description of the construction or operation, which is discussed hereinafter, of electric switch 25 is desired, reference may be had to U.S. Pat. No. 3,648,214 issued Mar. 7, 1972 to J. L. Slonneger which is incorporated herein by reference.

OPERATION

In the operation of control circuit 11, assume that the temperature in the space sensed by bulb 99 of condition responsive electric switch 25 is in excess of the predetermined temperature value at which the electric switch is manually adjusted to operate, as previously discussed, so that the component parts of the control circuit are positioned as described hereinbefore and as shown in FIGS. 1 and 4. Therefore, switch blade 65 is in its at-rest position making its movable contact with stationary contact 53 of electric switch 25 so as to energize relay coil 49 through leads 51, 59, 73 across power source L1, L2, and abutment 79 of operator 75 urges or drives switch blade 69 toward a position engaging its movable contact 71 with stationary contact 55. Of course, energization of relay coil 49 causes its pole piece 47 to attract armature assembly 43 into magnetic holding engagement therewith so as to make movable contact 45 with stationary contact 37; therefore, with contacts 37, 45 made, it may be noted that relay 23 renders windings 17, 19 effective in motor winding circuit 15. However, since switch blade 69 is positioned to make its movable contact 71 with stationary contact 55 of electric switch 25, only winding 17 of the two windings 17, 19 rendered effective in motor winding circuit 15 by relay 23 is energized across power source L1, L2. In this manner, a circuit for energizing only motor winding 17 to effect operation of motor 15 in a high speed mode thereof is completed from line terminal L2 through lead 73, switch blade 65, its movable contact 67 made with stationary contact 53 of electric switch 25, lead 59, coil 49 of relay 23, lead 51 to line terminal L1 and therefrom through winding 17, lead 63, stationary contact 55 made with movable contact 71 of switch blade 69 of electric switch 25 back to line terminal L2 through lead 73.

Assuming that the high speed operation of fan motor 13 has reduced the temperature of the space sensed by bulb 99 so that it now senses a decreasing temperature, the pressure of the vapor charge in the bulb, capillary tube 97 and bellows 93 will decrease so as to correspondingly decrease the force exerted by the bellows through bearing assembly 95 onto operator 75 against the compressive force of range spring 101 acting thereon. Eventually, at another preselected sensed temperature, the decreasing force exerted by bellows 93 is sufficiently overcome by that of range spring 101 acting on operator 75 so that toggle spring 83 will begin to pivot the operator in the counterclockwise direction (as seen in FIG. 4). As is well known in the art, the more toggle spring 83 pivotally moves operator 75 in the counterclockwise direction, the effective force exerted by the toggle spring becomes stronger; therefore, the toggle spring acts to finally snap or pivotally move the operator in the counterclockwise direction. This snap action of operator 75 conjointly moves its abutment 79 toward a position disengaged from switch blade 69, as shown in FIG. 2, thereby to effect movement of the switch blade with characteristic snap action toward its at-rest position so as to break its movable contact 71 from stationary contact 55 and then make its movable contact with stationary contact 57. In this manner, it may be noted that the aforementioned circuit for energizing only winding 17 of motor winding circuit 15 is interrupted or broken upon the breaking of movable contact 71 from stationary contact 55, and another circuit is made through both of the two windings 17, 19 which are rendered effective in the motor winding circuit by relay 23, as previously discussed, when movable contact 71 makes with stationary contact 57. The circuit to energize windings 17, 19 is completed across power source L1, L2 from line contact L2 through lead 73, switch blade 65 making its movable contact 67 with stationary contact 53 of electric switch 25, lead 59, coil 49 of relay 23, lead 51, winding terminal 31 to line terminal L1 and back therefrom through windings 17, 19, lead 39, stationary contact 37 of relay 23 having movable contact 45 of armature assembly 43 made therewith, lead 61, stationary contact 57 of electric switch 25 having movable contact 71 of switch blade 69 made therewith, and lead 73 back to line terminal L2. It may be noted that the energization of windings 17, 19 in series circuit relation, as discussed above, effects the operation of fan motor 13 in another or intermediate speed mode which is predeterminately less than the high speed mode thereof.

Assuming that the intermediate speed operation of fan motor 13 also effects a reduction in the temperature of the space sensed by bulb 99 so that it continues to sense a decreasing temperature, the pressure of the vapor charge in the bulb, capillary tube 97 and bellows 93 will continue to decrease so as to correspondingly decrease the force exerted by the bellows through bearing assembly 95 onto operator 75 against the compressive force of range spring 101, as previously discussed. Therefore, at still another preselected sensed temperature, the compressive force of range spring 101 will effect further pivotal movement of operator 75 about its pivot point 85 in the counterclockwise direction (as seen in FIG. 4) to effect the driving engagement of abutment 77 on the operator with switch blade 65 of electric switch 25 and thereafter drive the switch blade toward a position breaking its movable contact 67 from stationary contact 53, as shown in FIG. 3. Of course, the breaking of movable contact 67 from stationary contact 53 interrupts the circuit connecting coil 49 of relay 23 across power source L1, L2 thereby to effect de-energization of the coil and consequently the demagnetization of its pole piece 47. When pole piece 47 is so demagnetized, armature assembly 43 returns to its at-rest position so as to make its movable contact 45 with stationary contact 35. Therefore, upon the making of movable contact 45 on armature assembly 43 with stationary contact 35, relay 23 is operable generally to render all three of windings 17, 19, 21 effective in motor winding circuit 15 so that they may be energized in series circuit relation to cause the operation of fan motor 13 in a third or slow speed mode. In this slow speed mode operation of fan motor 13, windings 17, 19, 21 are placed across power source L1, L2 in a circuit completed from line terminal L2 through lead 73, switch blade 69 making its movable contact 71 with stationary contact 57 of electric switch 25, lead 61, armature assembly 43 making its movable contact 45 with stationary contact 35 of relay 23, lead 41, winding terminal 33, windings 21, 19, 17 of motor winding circuit 15, and winding terminal 31 to line terminal L1.

Of course, if bulb 99 of electric switch 25 is subjected to an increasing temperature so as to effect a corresponding increase in the force exerted by bellows 93 on operator 75, the components of control circuit 11 will function generally in an order reverse to that described hereinabove to re-cycle fan motor 13 from its slow speed mode through its intermediate speed mode to its high speed mode.

From the foregoing, it is now apparent that a novel control circuit 11 has been provided meeting the objects and advantages set out hereinbefore, as well as others, and that changes may be made by those having ordinary skill in the art as to the precise arrangement, shapes, details and connections set forth herein for purposes of disclosure without departing from the spirit of the invention or the scope thereof which is set out by the claims which follow.

What I claim as new and desire to secure by Letters Patent of the United States is:

1. A control circuit for an electric motor operable generally at three different speeds and having three windings serially connected together in a main winding circuit with an end of one of the windings being adapted for connection with one side of a power source, the control circuit comprising a relay device including first and second contacts for connection with the winding circuit across another of the windings, switching means having a generally at-rest position in making engagement with said first contact so as to render the three windings effective in the main winding circuit, a pole piece adapted to be magnetized for attracting said switching means into making engagement with said second contact so as to render the one winding and the third winding effective in the main winding circuit, and a coil associated with said pole piece for magnetizing it with said coil having one end thereof adapted for connection with the one side of the power source; and a temperature condition responsive device including a third contact connected with the other end of said coil, a first switch blade adapted for connection with the other side of the power source and having a generally at-rest position in engagement with said third contact, said pole piece being magnetized by said coil to attract said switching means into engagement with said second contact when said first switch blade is engaged with said third contact, a fourth contact for connection with the winding circuit between the one winding and the third winding, a fifth contact connected with said switching means, a second switch blade for engagement with said fourth and fifth contacts having a generally at-rest position in engagement with said fourth contact and adapted for connection with the other side of the power source, the one winding being energized to effect operation of the motor at a first speed when said first and second switch blades are respectively engaged with said third and fourth contacts and said switching means is engaged with said second contact, and means actuated generally upon the occurrence of one preselected temperature condition for driving said second switch blade into engagement with said fifth contact when said first switch blade is engaged with said third contact to connect the one winding and the third winding across the power supply thereby to effect operation of the motor at a second speed and said driving means being further actuated upon the occurrence of another preselected temperature condition to drive said first switch blade toward disengagement from said third contact when said second switch blade is engaged with said fifth contact to connect the three windings across the power source thereby to effect operation of the motor at a third speed, said switching means returning to its generally at-rest position upon demagnetization of said pole piece when said first switch blade is disengaged from said third contact.

2. A control circuit for an electric motor adapted for three speed operation and having a main winding circuit with at least three windings, the control circuit comprising means automatically movable between a first position for connecting two of the windings in circuit relation and a second position for connecting all of the windings in circuit relation, and condition responsive means operable generally upon the occurrence of different preselected conditions for respectively effecting energization of one of the two windings or both of the two windings when said connecting means is in its first position and for also effecting the energization of the all of the windings when said connecting means is in its second position.

3. A control circuit as set forth in claim 2 further comprising means associated with said condition responsive means for actuating said connecting means from one of its first and second positions toward the other thereof when the one of the two windings and the both of the two windings are respectively energized.

4. A control circuit as set forth in claim 2 wherein said condition responsive means includes means for switching between a pair of positions, the two windings and the three windings being adapted for respective energization when said switching means is in a respective one of its position pairs.

5. A control circuit as set forth in claim 2 wherein said condition responsive means includes means for switching between a circuit making position and a circuit breaking position, the two windings and the one of the two windings being adapted for the respective energization thereof when said switching means is in a respective one of the circuit making position and the circuit breaking position thereof.

6. A control circuit as set forth in claim 2 wherein said condition responsive means comprises a pair of means operable generally for switching between a pair of positions, respectively, the two windings and the one of the two windings being adapted for the respective energization thereof when one of said switching means is in one position of its position pairs and the three windings being adapted for the energization thereof when said one switching means is in the other position of its position pairs, and the two windings and the three windings being adapted for the respective energization thereof when the other of said switching means is in a respective one of the positions of the position pairs thereof.

7. A control circuit as set forth in claim 6 wherein said condition responsive means further comprises means associated with said switching means and responsive to the occurrence of the different preselected conditions for effecting the switching operation of said switching means, respectively.

8. A control circuit for an electric motor adapted for three speed operation and having a main winding circuit with at least three windings, the control circuit comprising means movable between a first position for connecting two of the windings in circuit relation and a second position for connecting all of the windings in circuit relation, respectively, means operable generally upon the occurrence of preselected conditions for alternatively effecting energization of one of the two windings and both of the two windings when said connecting means is in its first position and for also effecting the energization of the all of the windings when said connecting means is in its second position, and means coupled with said energization effecting means for effecting the movement of said connecting means between its first position and its second position.

9. A control circuit for an electric motor adapted for three speed operation and having a main winding circuit with at least three windings, the control circuit comprising means movable between a first position for connecting two of the windings in circuit relation and a second position for connecting all of the windings in circuit relation, means operable generally upon the occurrence of preselected conditions for alternatively effecting energization of one of the two windings and both of the two windings when said connecting means is in its first position and for also effecting the energization of the all of the windings when said connecting means is in its second position, and said energization effecting means including switching means adapted for movement between a pair of circuit making positions, the both of the two windings being energized when said switching means is in one of its circuit making positions and the all of the windings being energized when said switching means is in the other of its circuit making positions.

10. A control circuit for an electric motor adapted for three speed operation and having a main winding circuit with at least three windings, the control circuit comprising means movable between a first position for connecting two of the windings in circuit relation and a second position for connecting all of the windings in circuit relation, means operable generally upon the occurrence of preselected conditions for alternatively effecting energization of one of the two windings and both of the two windings when said connecting means is in its first position and for also effecting the energization of the all of the windings when said connecting means is in its second position, and said energization effecting means including switching means movable between a circuit making position and a circuit breaking position, the one of the two windings and the both of the two windings being energized when said switching means is in its circuit making position and said switching means being in its circuit breaking position when the all of the windings are energized.

11. A control circuit for an electric motor adapted for three speed operation and having a main winding circuit with at least three windings, the control circuit comprising means movable between a first position for connecting two of the windings in circuit relation and a second position for connecting all of the windings in circuit relation, and means operable generally upon the occurrence of preselected conditions for alternatively effecting energization of one of the two windings and both of the two windings when said connecting means is in its first position and for also effecting the energization of the all of the windings when said connecting means is in its second position, said energization effecting means including first switching means movable between a circuit making position and a circuit breaking position, the one of the two windings and the both of the two windings being energized when said first switching means is in its circuit making position and said first switching means being disposed in its circuit breaking position when the all of the windings are energized, and second switching means movable between a pair of circuit making positions, the both of the two windings being energized when said second switching means is in one of its circuit making positions and the all of the windings being energized when said second switching means is in the other of its circuit making positions.

12. A control circuit as set forth in claim 11 wherein said connecting means includes third switching means movable between the first and second positions, and means coupled with said energization means for attracting said third switching means from one of the first and second positions to the other thereof when one of said first and second switching means is in the circuit making position and the other circuit making position thereof, respectively.

13. A control circuit for electrically connecting across a power source and in different speed effecting combinations at least three windings of a main winding circuit in an electric motor so as to effect three speed operation thereof, the control circuit comprising a pair of switches each having first and second positions for connecting the at least three windings in the different speed effecting combinations across the power source, said switches being in their first positions to connect one of the at least three windings across the power source thereby to effect motor operation at one speed, means actuated generally in response to preselected temperature conditions for selectively driving said switches toward their second positions, said driving means being actuated upon the occurrence of one preselected temperature condition to drive one of said switches to its second position when the other of said switches is in its first position so as to connect the one winding and another of the at least three windings across the power source and thereby effect motor operation at another speed and said driving means being further actuated upon the occurrence of another preslected temperature condition to drive said other switch to its second position when said one switch is in its second position so as to connect the at least three windings across the power source and thereby effect motor operation at a third speed, and means for rendering the three windings effective in the winding circuit when said switches are in their second positions and the one and another of the at least three windings effective in the winding circuit when said other switch is in its first position and said one switch is in either of its first and second positions.

14. A control circuit for an electric motor adapted for operation in three speed modes and having a main winding circuit with three windings adapted for connection in three different speed mode effecting combinations across a power source, said control circuit comprising means for rendering two of the windings effective in the winding circuit and alternatively rendering all three of the windings effective in the winding circuit, and a device operable generally in response to different preselected temperature conditions for respectively coupling one of the two windings or both of the two windings across the power source when the two windings are rendered effective in the winding circuit thereby to effect the operation of the motor in two different ones of the speed modes thereof and for also coupling the three windings across the power source when the three windings are rendered effective in the winding circuit thereto to effect the operation of the motor in the third different speed mode thereof.

15. A control circuit as set forth in claim 13 wherein said rendering means includes third switch means operable generally between first and second positions, said third switch means being disposed in its first position when the one winding and both the one winding and the another winding are respectively connected across the power source and said third switch also being disposed in its second position when the three windings are connected across the power source.

16. A control circuit as set forth in claim 15 wherein said rendering means further includes means adapted to be connected across the power source when one of said one and other switches is in one of the first and second positions thereof for effecting the operation of said third switch means between the first and second positions thereof.

17. A control circuit for an electric motor adapted for operation in three speed modes and having a main winding circuit with three windings adapted for energization in three different speed mode effecting combinations across a power source, the control circuit comprising a relay device adapted for operation so as to render two of the windings effective in the winding circuit and also to render all three of the windings effective in the winding circuit; and a condition responsive device including means adapted for coupling the two windings and one of the two windings across the power source when the two windings are rendered effective in the winding circuit whereby the motor is operated in two different ones of the speed modes and also adapted for coupling the three windings across the power source when the three windings are rendered effective in the winding circuit whereby the motor is operated in the third speed mode, and means associated with said coupling means and responsive to the occurrence of different preselected temperature conditions for effecting the coupling operations of said coupling means.

18. A control circuit as set forth in claim 17 wherein said relay device includes means for switching between a pair of positions, the two windings and the three windings being respectively rendered effective when said switching means is in a respective one of its position pairs.

19. A control circuit as set forth in claim 18 wherein said relay device further means operatively associated with said condition responsive device for actuating said switching means from one of the respective one position thereof toward the other of the positions thereof.

20. A control circuit as set forth in claim 17 wherein said coupling means includes means for switching between a pair of positions, the two windings and the three windings being respectively energized when said switching means is in a respective one of its position pairs.

21. A control circuit as set forth in claim 17 wherein said coupling means includes means for switching between a circuit making position and a circuit breaking position, the two windings and the one of the two windings being respectively energized when said switching means is in a respective one of the circuit making position and the circuit breaking position thereof.

22. A control circuit as set forth in claim 17 wherein said coupling means comprises a pair of means for respectively switching between a pair of positions, the two windings and the one of the two windings being energized when one of said switching means is in one position of its position pairs and the three windings being energized when said one switching means is in the other position of its position pairs, and the two windings and the three windings being respectively energized when the other of said switching means is in a respective one of its position pairs.

* * * * *